Jan. 6, 1959     I. C. FORNEY     2,867,248
AUTOMOBILE THERMOS JUG HOLDER
Filed March 9, 1956
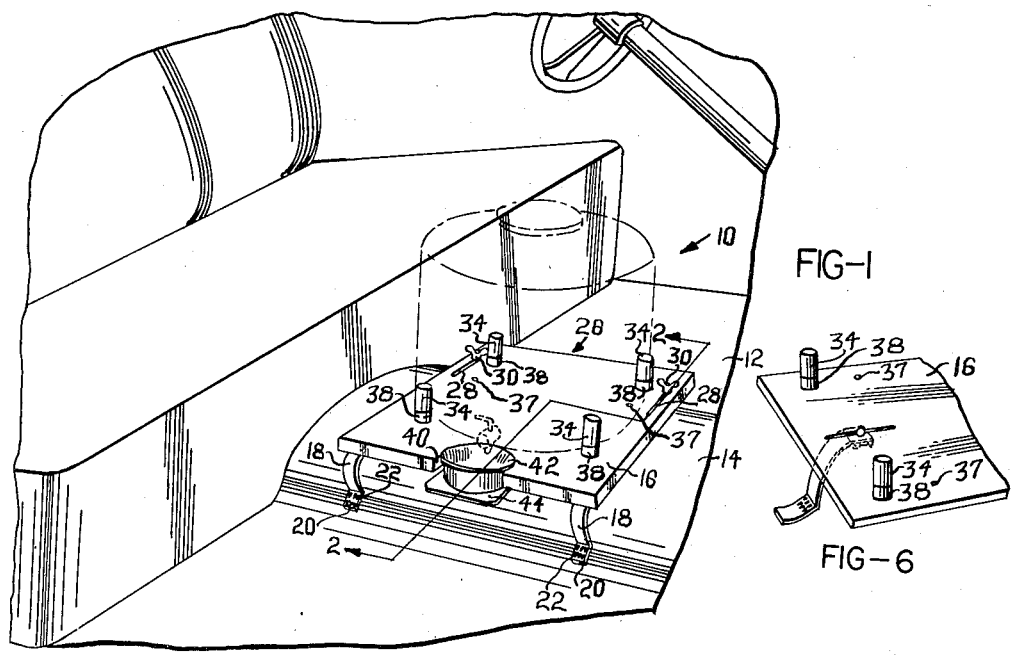
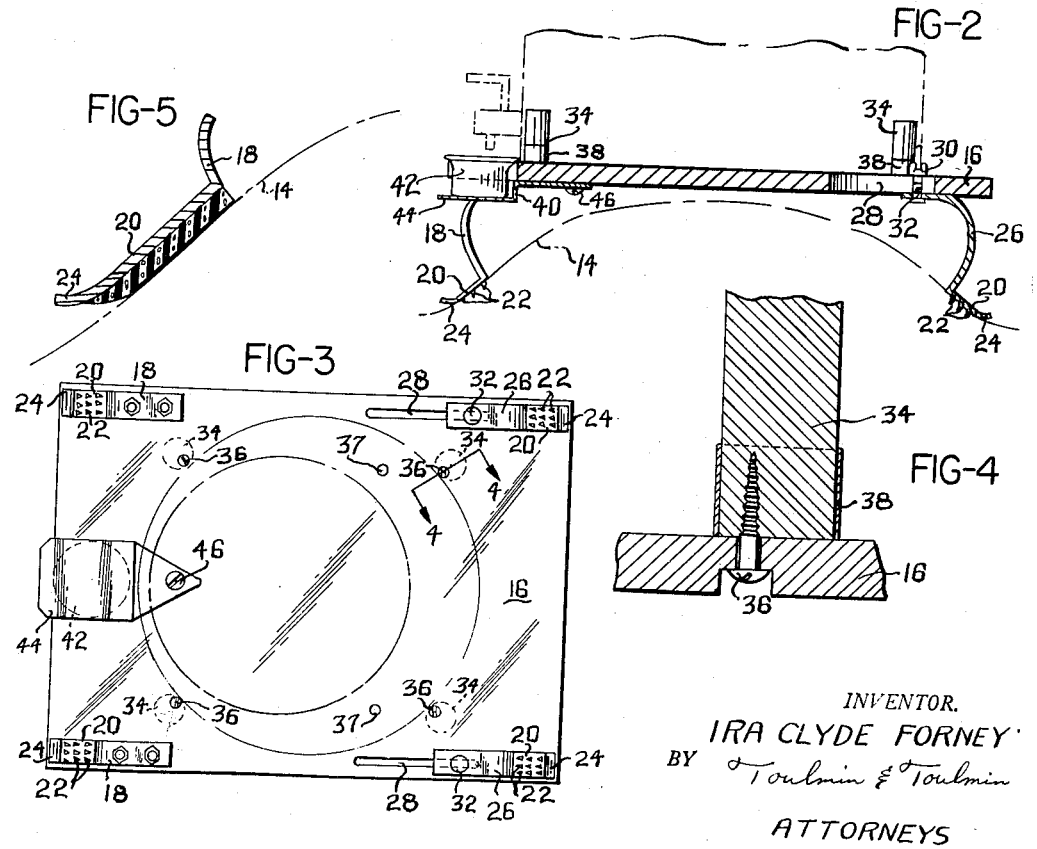
INVENTOR.
IRA CLYDE FORNEY
BY Toulmin & Toulmin
ATTORNEYS

United States Patent Office 2,867,248
Patented Jan. 6, 1959

2,867,248

AUTOMOBILE THERMOS JUG HOLDER

Ira C. Forney, Newton, Kans.; Birdie F. Forney, executrix of said Ira C. Forney, deceased Application March 9, 1956, Serial No. 570,631

1 Claim. (Cl. 141—375)

This invention relates to a device for use in connection with automobiles, and is particularly concerned with a device for supporting Thermos jugs on the floor of an automobile so that it will be available for use at all times.

In making long motor trips, thirst can be controlled and the trip made less tiresome if cold water is available. Cold water can readily be provided by a convenient type Thermos jug by supporting the jug in a convenient location in the automobile, is difficult, and is also usually as inconvenient to use as it would be to stop the car and get out to get a drink of cold water.

Having the foregoing in mind, it is the primary object of the present invention to provide a support for Thermos jugs so that the Thermos jug can be situated in an automobile where it will be readily available at all times.

A particular object is to provide a holder of a nature which will remain stationary in the car even when the car is being driven and which is arranged so that water can be drawn therefrom while the car is in motion.

A still further object is the provision of a holder for a Thermos jug or the like which is particularly adapted for supporting the jug in a car during a trip or that can readily be removed from the car to support the jug on the ground or on a picnic table or the like.

It is also a particular object to provide a holder for the Thermos jug or the like which comprises as an integral part thereof, a holder or support platform for a cup so that at all times the cup can be placed beneath the Thermos jug and water drawn therefrom even while the car is in motion.

The foregoing objects as well as still other objects and advantages of this invention will be more apparent upon referring to the following specifications taken in connection with the accompanying drawings in which:

Figure 1 is a fragmentary perspective view of a jug holder according to this invention mounted in the front compartment of the automobile;

Figure 2 is a sectional view indicated by line 2—2 on Figure 1 showing the manner in which the legs of the jug holder are adapted for embracing the tunnel portion found in the front of most passenger cars;

Figure 3 is a view looking up from beneath the jug holder showing the adjustable mounting thereon of the legs of the holder;

Figure 4 is a fragmentary view indicated by line 4—4 on Figure 3 showing the manner in which the parts which hold the jug in position can be made adjustable to accommodate different sizes of jugs;

Figure 5 is a fragmentary view showing the manner in which the legs of the holder can be provided with rubber-like pads for engaging with the side of the raised portion of the floor of the automobile; and Figure 6 is a perspective view of a modification of the invention.

Referring to the drawings somewhat more in detail, Figure 1 shows the front compartment 10 of a car having floor portion 12 in the center of which is a raised tunnel part 14 through which the drive shaft of the car extends beneath which is mounted the transmission of the automobile.

The device according to this invention is adapted for mounting on the portion 14 of the floor in the front of the car as will be seen in Figures 1 and 2. The device comprises the flat platform 16 having the legs 18 at one side that have downwardly and outwardly inclined feet thereon to engage the inclined side of the raised portion 14 of the floor.

Feet 20 may be barbed as at 22 so as to bite into the floor covering of the car if so desired.

Feet 20 also preferably comprise turned out end parts at 24 so that the legs can engage a flat surface, such as a table top or level ground without scratching or digging into the surface.

The legs on the opposite side of the platform 16 from legs 18 are indicated at 26 and are retained on platform 16 adjustably in 28 by availing of wing nuts 30 on retaining bolts 32.

Platform 16 comprises a plurality of upstanding posts 34 which, as will be seen in Figure 4, are retained in position on platform 16 by screws 36 which are located off center of the axes of the posts so that the posts can be rotated close by to embrace jugs of different sizes. For example, if the posts are one and one-fourth inches in diameter, the screws might be located one-fourth inch from one side edge of the center of the posts and the rotating of each post 180 degrees will serve to vary its effective diameter by three-fourths of an inch whereby a one and one-half inch total adjustment of the diameter of the jug that can be retained can be expected.

Other holes, as at 37, may be provided to permit the posts to be placed in other positions whereby the device can accommodate jugs of substantially any size.

A metal band 38 may be mounted around the bottom of each post to prevent the base from splitting from the screws 36 therein and also to provide added strength against abrasion at the bottom of the posts due to the jug.

At one side of platform 16, it is provided with a notch 40 of a size for receiving a container 42 which may be the top for the Thermos jug. Located beneath the notch 40 is a small platform 44 for supporting the container, platform 44 may be fastened beneath platform 16 as by use of bolt 46 so as to permit platform 44 to be turned backwardly beneath platform 16 when not in use.

Due to the fact that the portion 14 of different cars vary as to size and may in some cases, taper considerably from front to back, it is also conceivable that the two legs on one side of the platform can be replaced by a single leg whereby a tripod arrangement will be formed to provide for automatic adjustment of the device to the taper over the raised portion of the floor. Also such arrangements permit the holder to accommodate itself to irregularities in flat surfaces such as tops of picnic tables or to the surface of the ground.

It will be understood that this invention is susceptible to modification in order to adapt it to different usages and conditions and accordingly, it is desired to comprehend such modifications within the invention as may fall within the scope of the appended claim.

I claim:

In receptacle holder means for automobiles and the like vehicles, the combination with a jug-shaped receptacle having a rounded edge and flat bottom portion with substantially vertical side walls and having a discharge spigot located in the side wall adjacent the bottom portion, a receptacle holder comprising a rectangular platform, leg means attached to said platform, said legs being arranged in spaced pairs and comprising outwardly inclined feet portions for engaging a raised arcuate shaped floor section of the vehicle, a notch in the platform at one side and means therebeneath to receive and support a receptacle beneath said discharge spigot of the jug, said leg means being secured to the underneath side of said platform and extending downwardly therefrom, each of said leg means having a downwardly and outwardly projecting foot portion at its lower end whereby the leg means will engage the side walls of the raised arcuate floor of said vehicle and support the platform horizontally, said pairs of leg means being adjustable toward and away from each other.

References Cited in the file of this patent

UNITED STATES PATENTS

| | | |
|---|---|---|
| 977,818 | McManus | Dec. 6, 1910 |
| 1,017,756 | Head | Feb. 20, 1912 |
| 1,050,301 | Schenk | Jan. 14, 1913 |
| 1,684,925 | Perlmutter | Sept. 18, 1928 |
| 1,777,759 | Melvin | Oct. 7, 1930 |
| 1,947,879 | Sandberg et al. | Feb. 20, 1934 |
| 1,973,226 | Rose et al. | Sept. 11, 1934 |
| 2,473,351 | Thompson et al. | June 14, 1949 |
| 2,666,612 | Howell | Jan. 19, 1954 |
| 2,699,313 | Tarman | Jan. 11, 1955 |